June 11, 1935.  W. J. BEATTY  2,004,154
ROAD PLANER
Filed May 21, 1934  2 Sheets-Sheet 1
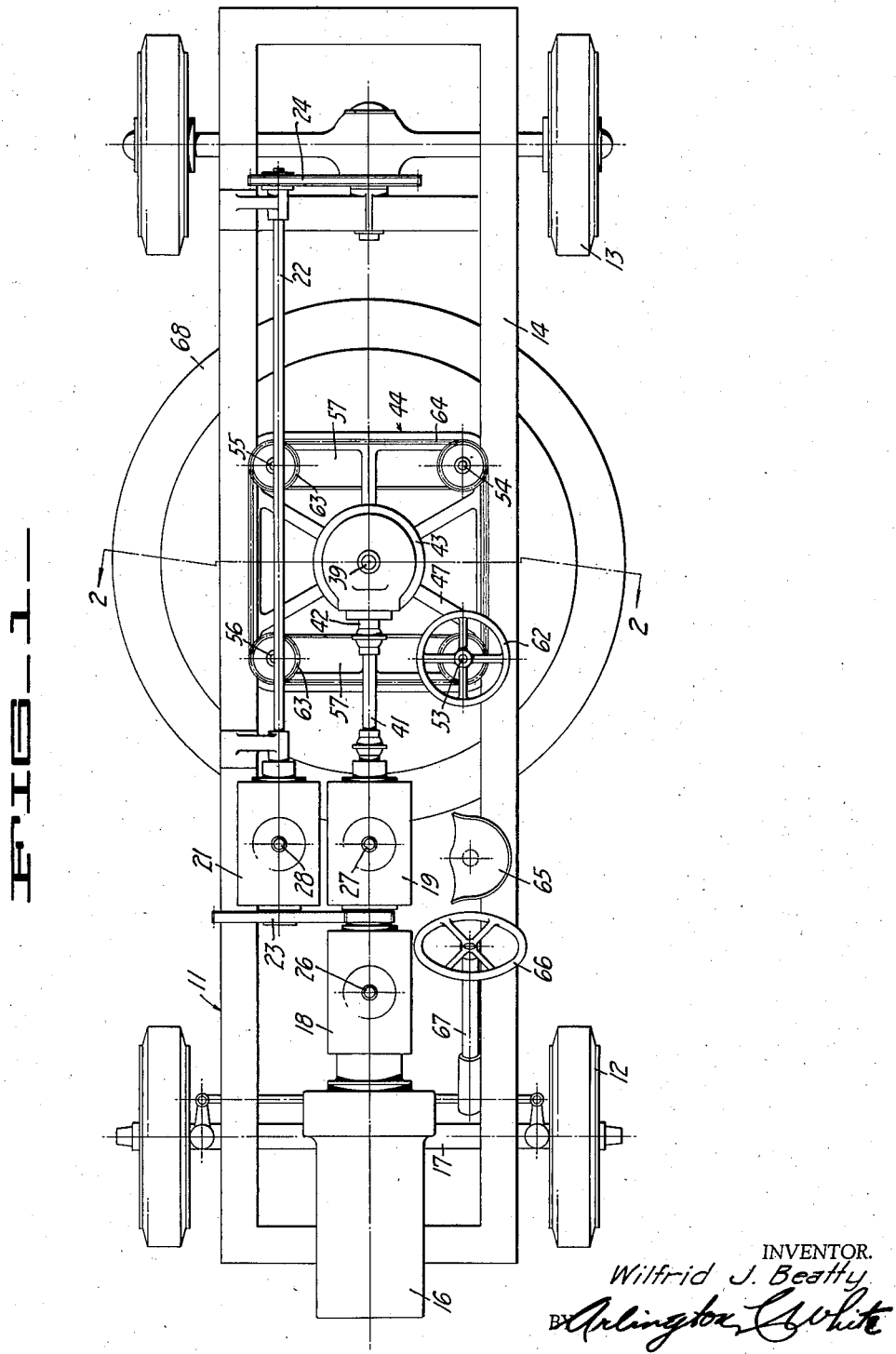
INVENTOR.
Wilfrid J. Beatty
BY
ATTORNEY.

June 11, 1935. W. J. BEATTY 2,004,154
ROAD PLANER
Filed May 21, 1934 2 Sheets-Sheet 2
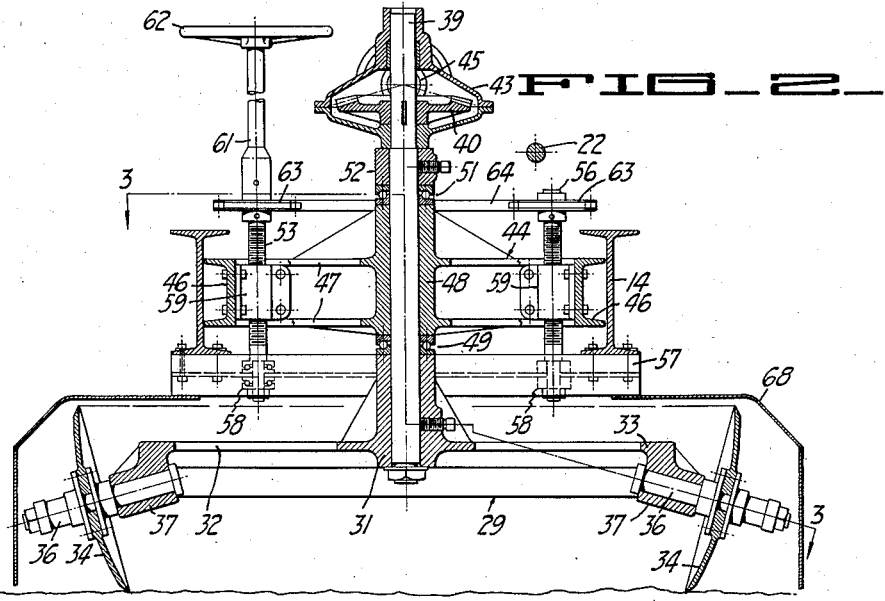
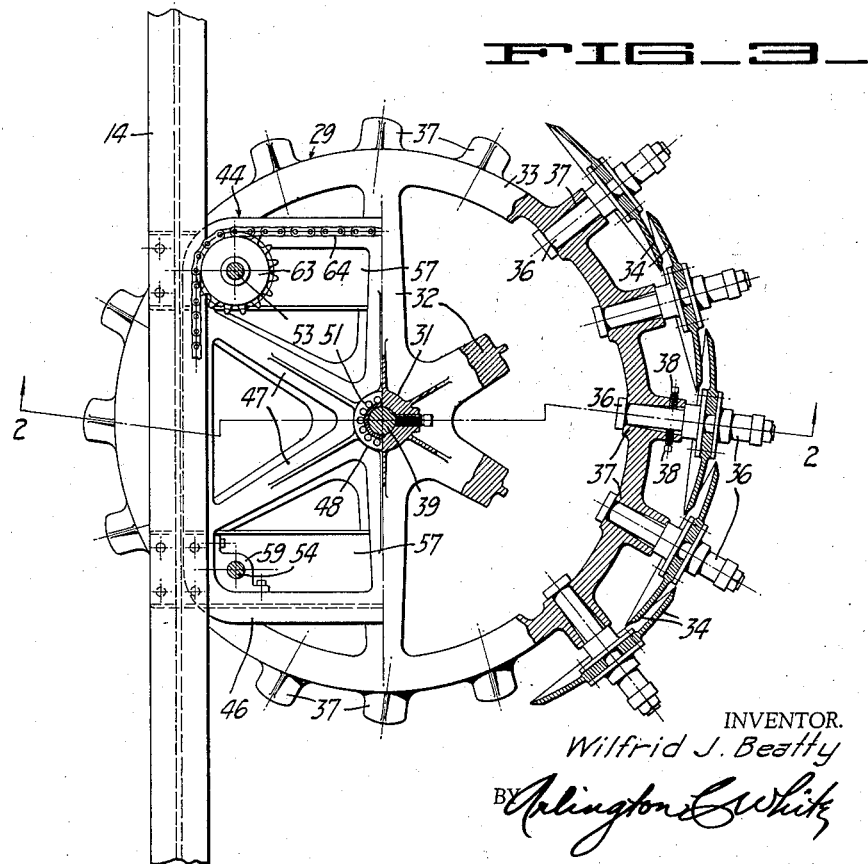
INVENTOR.
Wilfrid J. Beatty
BY
ATTORNEY.

Patented June 11, 1935

2,004,154

UNITED STATES PATENT OFFICE 2,004,154

ROAD PLANER

Wilfrid J. Beatty, Castroville, Calif.

Application May 21, 1934, Serial No. 726,636

6 Claims. (Cl. 37—108)

The invention, in general, relates to road repairing equipment. More particularly, the invention relates to improved means for smoothing the roughened surfaces of streets and highways.

The mechanism embodying my invention is particularly suitable for working macadamized, concrete or composite asphalt-concrete and like surfaces, regardless of their degree of hardness and under all conditions of roughness, so as to recondition or return them substantially to their original smoothness.

One of the important objects of the invention is to provide mechanism which effectively smooths roughened or undulatory surfaces of roads and highways in a minimum of time and with a minimum of operations.

Another object of the invention is to provide self-propelled mechanism which can readily be operated with but one attendant.

A still further object of my invention is to provide a road planing device of the aforementioned character which is relatively inexpensive to construct and is economical to operate.

Other objects of the invention, together with some of the advantageous features thereof, will appear in the following description of the preferred embodiment of the invention which is illustrated in the accompanying drawings. While I have shown a preferred embodiment in the drawings, it is to be understood that I am not to be limited to such embodiment, as the invention, as defined in the appended claims, may be embodied in a plurality and variety of forms.

Referring to the drawings:

Figure 1 is a diagrammatic plan of an embodiment of my invention;

Figure 2 is a view of the embodiment shown in Figure 1, taken on the section lines 2—2 of Figures 1 and 3; and Figure 3 is a view of the embodiment, taken on the section line 3—3 of Figure 2.

In its preferred form, the road planer of my invention preferably comprises a vehicle adapted to advance over a road, means supported on said vehicle and movable thereby during the advance thereof, together with a plurality of cutting discs independently and rotatably mounted on said means, and means for lowering and raising said discs into and from engagement with the surface to be worked.

As illustrated in Figure 1 of the drawings, a suitable vehicle 11 is provided, such as a motor truck having a pair of front ground-engaging wheels 12 and a pair of rear or driven wheels 13, all suspended from a main frame 14. A prime mover 16, which can be a standard gas engine, conveniently is utilized for advancing the vehicle and is mounted on the frame in the usual manner above the front axle 17 connecting the wheels 12. Any suitable driving connections between the engine 16 and the drive wheels 13 can be employed, although in the embodiment shown in the drawings the drive includes a series of transmissions 18, 19 and 21, together with a shaft 22, extending longitudinally of the vehicle, and sprocket and chain connections 23 and 24. Suitable levers 26, 27 and 28, are provided for adjusting the gearing so as to operate the vehicle and attendant mechanism at desirable speeds.

In accordance with my invention, a revolvable bull-wheel or turntable 29 is mounted upon the vehicle so as to be adjustably suspended below the frame thereof approximately midway between the front and rear wheels. Any desired type of bull-wheel may be utilized but in the embodiment illustrated, the bull-wheel 29 consists of a hub 31 connected by means of spokes 32 to a relatively wide rim 33. A plurality of rotatable cutting discs 34 are provided and preferably independently mounted about the rim 33 of the turntable. While the mounting of the discs may be effected by means of straps or brackets, I preferably fasten each disc 34 to a hub mounted on roller bearings which are carried by a spindle 36. Each spindle 36 preferably is mounted in an inclined offset portion 37 of the rim of the wheel. In the embodiment shown, but one row or line of cutting discs 34 is employed, but it is to be understood that a plurality of rows of discs, whether mounted on suitable spindles on the outside or inside of the rim 33, can be provided without departing from the scope of my invention.

The arrangement and mounting of the rotatable cutting discs 34 upon the rim of the wheel are preferably such that all discs are given a uniform and definite pitch with respect to the rim, see particularly Figure 2 of the drawings, and the series of discs are in overlapping relationship, as clearly depicted in Figure 3 of the drawings. Accordingly, the line of draft of the cutting edge of each disc, as the vehicle 11 is advanced, will be constantly different from the line of draft of each of the cutting edges of the other discs and, hence, a greater working of the surface traversed will be effected. Moreover, the discs 34 are so mounted on the turntable that the over-all diameter of the circle of cutting discs is slightly greater than the tread of the vehicle and, therefore, the rear or driving wheels of the vehicle will ride upon the smoothened surface of the street or highway as the cutting discs do their work. This advantageous feature of my machine avoids the constant pitching common to present types of planers caused by the rolling of the wheels at all times over the undulatory or roughened surface of the street being worked upon. Means are provided for altering the line of draft of the cutting edge of each disc 34, should it be found desirable to do so. These means comprise a pair of set screws 38 which pierce the bearings 37 of the rim of the wheel and engage opposite sides of each of the spindles 36. Turning up of either one of each pair of set screws moves the spindle upon which it engages away therefrom and alters the line of draft of the cutting disc carried thereby.

In order to revolve the bull-wheel 29 and to control its rotary movement, I provide a positive drive between the same and the engine 16 of the vehicle. The drive for the bull-wheel includes a vertically disposed shaft 39, to which the wheel is secured and upon which a main gear 40 is carried. The bull-wheel drive also includes a driven shaft 41 leading from the transmission 19 and connected therein to the drive shaft of the engine 16. The driven shaft 41 is universally coupled to a stub shaft 42 upon which is carried a pinion 45, which meshes with the main gear 40 on the vertically disposed shaft 39. The gear 40 and pinion conveniently are encased in a housing 43 which encompasses the shaft 39. With the engine 16 in operation, the gear lever 27 of the transmission 19 can be moved to place the drive shaft of the engine into driving connection, at desirable speeds, with the shaft 41. Rotation of the shaft 41 is transmitted, by means of the pinion and gear 40, to the vertical shaft 39 and to the bull-wheel 29. With the cutting discs 34 in engagement with a surface, revolution of the wheel 29 causes independent rotational movement of each disc and consequently a continual cutting of the roughened surface as the vehicle is advanced over the same. It should be observed that the frictional engagement of the cutting edges of the discs with the surface being worked, effects a sharpening of the edges because of the pitch of the discs.

To maintain the cutting discs 34 in constant engagement with a surface being worked, I mount a relatively heavy member 44 upon the vehicle and so dispose the same that its weight is applied to the bull-wheel 29. The member 44 may take the form of a wheel or, as shown in the accompanying drawings, may be square shaped. Preferably, the member 44 is formed of relatively heavy channel beams 46 and a pair of intersecting beams 47 which meet at a central boss or sleeve 48. The member 44 is movably supported on the vehicle and is disposed with its central boss 48 encompassing the vertical shaft 39 which drives the bull-wheel 29, the shaft being freely rotatable in the boss or sleeve 48. Interposed between the sleeve 48 and the hub 31 of the bull-wheel is a combination rotary and thrust bearing 49 thereby to enable revolution of the wheel and to bear the downward thrust of the member 44. Likewise, a combination rotary and thrust bearing 51 is interposed between the sleeve 48 of the member 44 and a collar 52 which is keyed to the shaft 39 just below the housing 43.

Means are provided for raising and lowering the bull-wheel 29 from and to the surface to be worked upon. These means include a plurality of vertically disposed rods 53, 54, 55 and 56 which are rigidly fastened adjacent the corners of the member 44 to cross-beams 57 which conveniently are bolted to the frame 14 of the vehicle. Each of the rods 53 to 56 inclusive is journaled in a bearing 58 clamped to a cross-beam 57 and each rod is threaded for receiving interiorly threaded collars 59 carried by the member 44. The rod 53 is connected to a post 61 which carries a hand-wheel 62 for positively rotating the rod 53. The remaining rods, 54 to 56 inclusive, are connected by means of sprockets and chains 63 and 64 to rod 53 and consequently are revolved with the rotation of rod 53. Inasmuch as the rods 53 to 56 inclusive are rigidly fastened, except as to rotational movement, to the beams 57, the rotation of the rods causes a raising and lowering of the member 44 and consequently also a raising and lowering of the bull-wheel 29 from and to the surface worked upon, since a raising of the member 44 lifts the shaft 39 which is connected to the bottom of the hub 31 of the wheel, while the lowering of the member 44 effects a direct lowering of the bull-wheel 29 through the bearing 49. The bearing 49 bears the thrust of the member 44 upon the lowering thereof while the bearing 51 bears the thrust of the member 44 when the bull-wheel is raised from the ground. It is to be noted that the raising and lowering of the bull-wheel 29 does not disturb the connections between the shaft 39 and driven shaft 41 since a universal joint connects the shaft 41 and 42, the latter carrying the pinion which meshes with the main gear 40 on the shaft 39. While I have described a preferred combination of means for raising and lowering the bull-wheel 29, it is apparent that equivalent means can be employed for this purpose without departing from the invention.

The hand-wheel 62 for rotating the rods 53 to 56 inclusive is conveniently affixed to the vehicle so as to be within ready grasp of the operator of the vehicle. As shown in Figure 1 of the drawings, an operator seat 65 is supported on the frame 14 intermediate the hand-wheel 62 and a driving wheel 66 which is fastened to the steering-post 67 of the vehicle. The seat 65 is located also within easy reach of the gear levers 26, 27 and 28.

In order to prevent scattering or throwing of pieces of the surface being worked upon by the rotating discs, I provide a depending skirt 68 which conveniently is mounted on the cross-bars 57 of the vehicle and which is draped about the bull-wheel 29.

I claim:

1. A road planer comprising a vehicle adapted to be advanced over a surface, a rotatable member supported on said vehicle and actuated during the advance thereof, and a plurality of surface-engaging cutting discs rotatably mounted in overlapping relationship on said member.

2. A road planer comprising a vehicle adapted to be advanced over a surface, a turntable supported on said vehicle and actuated by the advance thereof, a plurality of surface-engaging cutting discs rotatably mounted in overlapping relationship on said turntable, and means for raising and lowering said turntable and discs from and to the surface.

3. A road planer comprising a revolvable member, means for revolving said member, and a plurality of surface-engaging cutting discs rotatably mounted in overlapping relationship on said member.

4. A road planer comprising a bull-wheel having a rim, means for driving said bull-wheel, and a plurality of surface-engaging cutting discs mounted in overlapping relationship around said rim; the line of draft of each disc being different than the line of draft of the other discs.

5. A road planer comprising a turntable, means for actuating said turntable, and a plurality of surface-engaging cutting discs rotatably mounted in overlapping relationship on said turntable; each of said discs having a convex exterior surface and being disposed at a definite pitch with respect to the surface of the road to be planed.

6. A road planer comprising a revolvable member, means for driving said member during the advance of the planer, and a plurality of surface-engaging rotatable cutting discs depending from said member in a generally circular path and in overlapping relationship.

WILFRID J. BEATTY.